United States Patent
Agnihotram et al.

(10) Patent No.: US 11,416,532 B2
(45) Date of Patent: Aug. 16, 2022

(54) METHOD AND DEVICE FOR IDENTIFYING RELEVANT KEYWORDS FROM DOCUMENTS

(71) Applicant: WIPRO LIMITED, Bangalore (IN)

(72) Inventors: Gopichand Agnihotram, Bangalore (IN); Suyog Trivedi, Indore (IN); Rajesh Kumar, Patna (IN)

(73) Assignee: Wipro Limited, Bangalore (IN)

( * ) Notice: Subject to any disclaimer, the term of this patent is extended or adjusted under 35 U.S.C. 154(b) by 556 days.

(21) Appl. No.: 16/036,978

(22) Filed: Jul. 17, 2018

(65) Prior Publication Data

US 2019/0370396 A1    Dec. 5, 2019

(30) Foreign Application Priority Data

May 31, 2018 (IN) .............................. 201841020524

(51) Int. Cl.
*G06F 16/35* (2019.01)
*G06N 3/08* (2006.01)
*G06F 16/93* (2019.01)
*G06F 16/31* (2019.01)

(52) U.S. Cl.
CPC .......... *G06F 16/353* (2019.01); *G06F 16/313* (2019.01); *G06F 16/93* (2019.01); *G06N 3/08* (2013.01)

(58) Field of Classification Search
CPC ...... G06F 16/353; G06F 16/93; G06F 16/313; G06N 3/08
See application file for complete search history.

(56) References Cited

U.S. PATENT DOCUMENTS

| 6,098,034 A * | 8/2000 | Razin ................... G06F 16/30 704/9 |
| 9,090,802 B2 | 7/2015 | Akella |
| 10,339,826 B1 * | 7/2019 | Somasundaran ...... G09B 19/00 |
| 10,706,098 B1 * | 7/2020 | Ramesh ............... G06F 40/134 |
| 2005/0086215 A1 | 4/2005 | Perisic |
| 2006/0248076 A1 | 11/2006 | Troy et al. |
| 2007/0073831 A1 * | 3/2007 | Oscherov ............ H04L 67/1021 709/217 |
| 2010/0145678 A1 | 6/2010 | Csomai et al. |
| 2010/0161591 A1 * | 6/2010 | Jones ...................... G06F 16/29 707/722 |

(Continued)

*Primary Examiner* — Alford W Kindred
*Assistant Examiner* — Tiffany Thuy Bui
(74) *Attorney, Agent, or Firm* — Finnegan, Henderson, Farabow, Garrett & Dunner, LLP

(57) ABSTRACT

A method of identifying relevant keywords from a document is disclosed. The method includes splitting text of the document into a plurality of keyword samples, such that each of the plurality of keyword samples comprises a predefined number of keywords extracted in a sequence. Further, each pair of adjacent keyword samples in the plurality of samples includes a plurality of common words. The method further includes determining a relevancy score for each of the plurality of keyword samples based on at least one of a trained Convolution Neural Network (CNN) model and a keyword repository. The method further includes classifying keywords from each of the plurality of keyword samples as relevant keywords or non-relevant keywords based on the relevancy score determined for each of the plurality of keyword samples.

15 Claims, 9 Drawing Sheets

(56) References Cited

U.S. PATENT DOCUMENTS

| | | | |
|---|---|---|---|
| 2016/0189057 A1* | 6/2016 | Rao | G06F 16/285 |
| | | | 706/12 |
| 2016/0224662 A1* | 8/2016 | King | G06F 16/332 |
| 2017/0236032 A1* | 8/2017 | Lin | G06K 9/6262 |
| | | | 382/159 |
| 2018/0047395 A1* | 2/2018 | Sommers | G06F 40/58 |
| 2018/0113933 A1* | 4/2018 | Lewis | G06F 16/3344 |
| 2019/0095526 A1* | 3/2019 | Adwait | G06F 40/289 |

* cited by examiner

| T(k)   | 0.1  | 0.8  | -0.9 | 0.3  | -0.1 |
|--------|------|------|------|------|------|
| T(k+1) | -0.8 | 0.1  | 0.7  | -0.2 | 0.9  |
| T(k+2) | 0.1  | -0.6 | 0.5  | 0.7  | -0.3 |
| T(k+3) | 0.7  | 0.2  | -0.4 | 0.3  | -0.3 |

⟵ Size of Vector Embedding ⟶

| Steps | Step Wise Result |
|---|---|
| Input Text | "I am a software developer. I have expertise in java and html" |
| Pre-processing | software, develop, expertise, java, html |
| Manual labels by the user | (software,0), (develop,0), (expertise,0), (java,1), (html,1) |
| Preparing keyword samples and creating vector embedding | $T_{software}, T_{develop}, T_{expertise}, T_{java}, T_{html}$<br>where $T_i$ is 100-dimensional vector embedding of i, for example:<br>$T_i = [0.01, 0.02, -0.05, ..., ...]_{1 \times 100}$ for i = 1 |
| Assigning relevancy score to keyword samples using vector embedding | $(x_1, y_1) = ((T_{software}, T_{develop}, T_{expertise}), 0)$<br>$(x_2, y_2) = ((T_{develop}, T_{expertise}, T_{java}), 1)$<br>$(x_3, y_3) = ((T_{expertise}, T_{java}, T_{html}), 1)$ |

— 610

| Steps | Step Wise Result |
|---|---|
| Input Text | "I have worked at oracle for 5 years. I have hands on experience in oracle, MySQL, spring" |
| Model output | Oracle, MySQL, springs — Relevant Keywords<br>Worked, years, experience, hands — Non-Relevant Keywords |

METHOD AND DEVICE FOR IDENTIFYING RELEVANT KEYWORDS FROM DOCUMENTS

TECHNICAL FIELD

This disclosure relates generally to processing of documents, and more particularly to a method and device for identifying relevant keywords from documents.

BACKGROUND

Advancements in computer technology have made it possible to process a large number of documents in a short amount of time. For processing the documents, extracting relevant keywords from a document may assume greater importance for obtaining context of the document.

The documents may either have structured data or unstructured data. Documents having the structured data may include information with a high degree of organization, which makes the information easier to deal with by computers. As such, these documents are readily searchable by simple search engine algorithms or search operations. On the other hand, the documents having the unstructured data may not have keywords assigned to these documents, and may involve manual assigning of keywords which is time and intensive process, and the documents may not be easily readable by computers. The unstructured data further makes extracting relevant keywords difficult a procedure.

Some conventional methods automate the process of extracting relevant keywords. The conventional methods may employ machine learning techniques for extracting relevant keywords. One such conventional method is unsupervised learning technique which involves training a machine (computer) using information which is neither classified nor labeled and by running an algorithm without any guidance. The unsupervised learning technique may be more suitable for extracting relevant keywords from documents like topic models and frequency based models. Another such conventional method is a supervised learning technique that may include a supervisor as a teacher. The supervisor may teach or train the machine using data which is well labeled (that is, at least some data is already tagged with correct answers). However, such supervised learning techniques are not very effective in extracting relevant keywords from unstructured documents.

By way of an example, resumes of job candidates may be unstructured documents, and hence manually classifying or shortlisting resumes based on relevant keywords may become difficult for a hiring manager. Further, the process of hiring candidates may also involve preparing job description, which again is a time and effort intensive job. Moreover, for preparing the job description, a person preparing the job description has to update himself with the required latest skill sets for the job, thereby making the process further time and effort intensive.

SUMMARY

In one embodiment, a method for identifying relevant keywords from a document is disclosed. In one embodiment, the method may include splitting text of the document into a plurality of keyword samples, such that each of the plurality of keyword samples may comprise a predefined number of keywords extracted in a sequence, and such that each pair of adjacent keyword samples in the plurality of samples may comprise a plurality of common words. The method may further include determining a relevancy score for each of the plurality of keyword samples based on at least one of a trained Convolution Neural Network (CNN) model and a keyword repository. The method may further include classifying keywords from each of the plurality of keyword samples as relevant keywords or non-relevant keywords based on the relevancy score determined for each of the plurality of keyword samples.

In another embodiment, a keyword extracting device identifying relevant keywords from a document is disclosed. The keyword extracting device includes a processor and a memory communicatively coupled to the processor, wherein the memory stores processor instructions, which, on execution, causes the processor to split text of the document into a plurality of keyword samples, such that each of the plurality of keyword samples may comprise a predefined number of keywords extracted in a sequence, and such that each pair of adjacent keyword samples in the plurality of samples may comprise a plurality of common words. The processor instructions further cause the processor to determine a relevancy score for each of the plurality of keyword samples based on at least one of a trained CNN model and a keyword repository. The processor instructions further cause the processor to classify keywords from each of the plurality of keyword samples as relevant keywords or non-relevant keywords based on the relevancy score determined for each of the plurality of keyword samples.

In yet another embodiment, a non-transitory computer-readable storage medium is disclosed. The non-transitory computer-readable storage medium has instructions stored thereon, a set of computer-executable instructions causing a computer comprising one or more processors to perform steps comprising splitting text of the document into a plurality of keyword samples, such that each of the plurality of keyword samples may comprise a predefined number of keywords extracted in a sequence, and such that each pair of adjacent keyword samples in the plurality of samples may comprise a plurality of common words; determining a relevancy score for each of the plurality of keyword samples based on at least one of a trained CNN model and a keyword repository; and classifying keywords from each of the plurality of keyword samples as relevant keywords or non-relevant keywords based on the relevancy score determined for each of the plurality of keyword samples.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4B illustrates a table depicting matrix representation of vector embedding created for a plurality of samples, in accordance with an exemplary embodiment.

FIG. 6B illustrates exemplary models for populating a template for a job description, in accordance with an exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
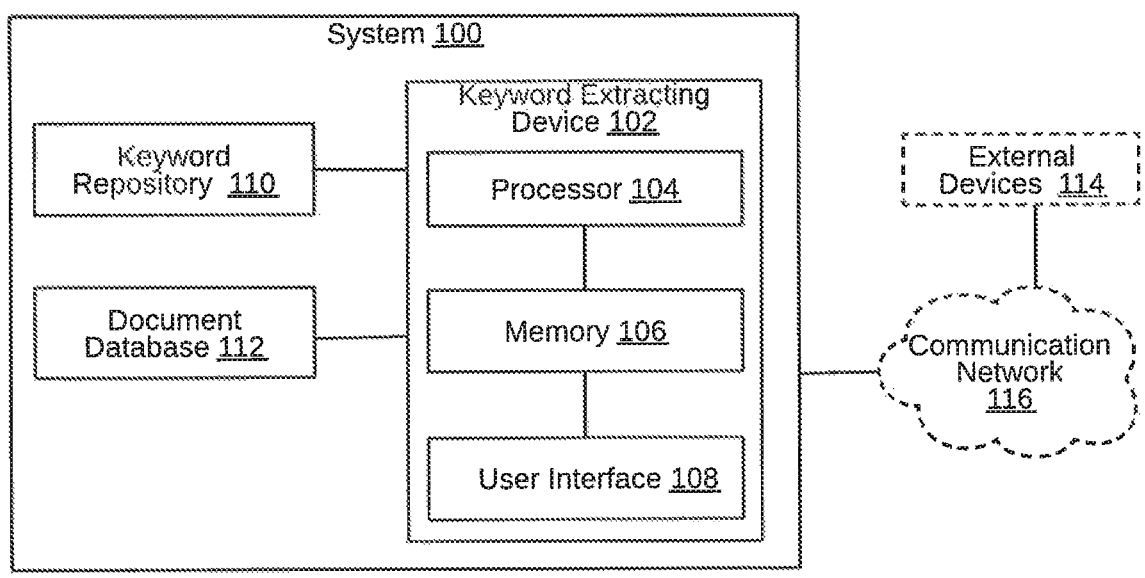
FIG. 1 is a block diagram illustrating a system for identifying relevant keywords from a document, in accordance with an embodiment.

In one embodiment, a system 100 for identifying relevant keywords from a document is illustrated in the FIG. 1, in accordance with an embodiment. The system 100 may include a keyword extracting device 102, a keywords repository 110, and a document database 112. The keyword extracting device 102 may be a computing device having document processing capability. Examples of the keyword extracting device 102 may include, but are not limited to, server, desktop, laptop, notebook, netbook, tablet, smartphone, mobile phone, application server, sever, or the like.

The keyword extracting device 102 may identify relevant keywords from a document. The document, for example, may include, but is not limited to a portable document format (PDF) file, a word file, a webpage, or a transcript. To this end, the keyword extraction device 102 may be communicatively coupled to the keyword repository 110 and the document database 112. The document database 112 may include multiple document sets, which may include a training document set and a testing document set. The training document set may include a repository of documents that are used to train the keyword extraction device 102 to identify relevant keywords, while the testing document set may be used to test whether post training, the keywords identified by the keyword extraction device 102 are relevant or not.

The relevant and non-relevant keywords in the training document set may be stored in the document database 112. Thus, the document database 112 may act as a repository of relevant and non-relevant keywords. It will be apparent to a person skilled in the art that the system 100 may include multiple document databases 112, such that, each of the multiple document databases 112 are created for a particular application area. By way of an example, for software technologies a dedicated document database 112 may be created, while for electronics related technologies a separated document database 112 may be created.

As will be described in greater detail in conjunction with FIG. 2 to FIG. 7, once the keyword extraction device 102 is trained, in order to identify relevant keywords from a given document, the keyword extracting device 102 may split text of the document into a plurality of keyword samples. The keyword extracting device 102 may further determine a relevancy score for each of the plurality of keyword samples based on one or more of a trained Convolution Neural Network (CNN) model and a keyword repository. The keyword extracting device 102 may further classify keywords from each of the plurality of keyword samples as relevant keywords or non-relevant keywords based on the relevancy score determined for each of the plurality of keyword samples. Thereafter, the keyword extraction device 102 may store the relevant keywords and the non-relevant keywords in the document database 112.

In order to perform the above discussed functionalities, the keyword extracting device 102 may include a processor 104 and a memory 106. The memory 106 may store instructions that, when executed by the processor 104, cause the processor 104 to identify relevant keywords from a document as discussed in greater detail in FIG. 2 to FIG. 6. The memory 106 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

The memory 106 may also store various data (e.g., relevant keyword data, document data, keyword sample data, relevancy score data, Convolution Neural Network (CNN) model data, keyword repository data, training document set data, pre-processing data, comparison data, vector embedding data, natural language processing (NLP) data, template data, etc.) that may be captured, processed, and/or required by the system 100.

The keyword extracting device 102 may further include a user interface 108 through which the keyword extracting device 102 may interact with a user and vice versa. By way of an example, the user interface 108 may be used to display results of analysis performed by the keyword extraction device 102 to the user. By way of another example, the user interface 108 may be used by the user to provide inputs to the keyword extraction device 102. It will be apparent to a person skilled in the art that the keyword extraction device 102 may include the keyword repository 110 and the document database 112.

The system 100 may interact with one or more external devices 114 over a communication network 116 for sending or receiving various data. Examples of the external devices 114 may include, but are not limited to a remote server, a digital device, or another computing system. The communication network 116 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS). The external device 114 may provide one or more documents to the system 100, for which relevant keywords are to be identified.

Figure 2:
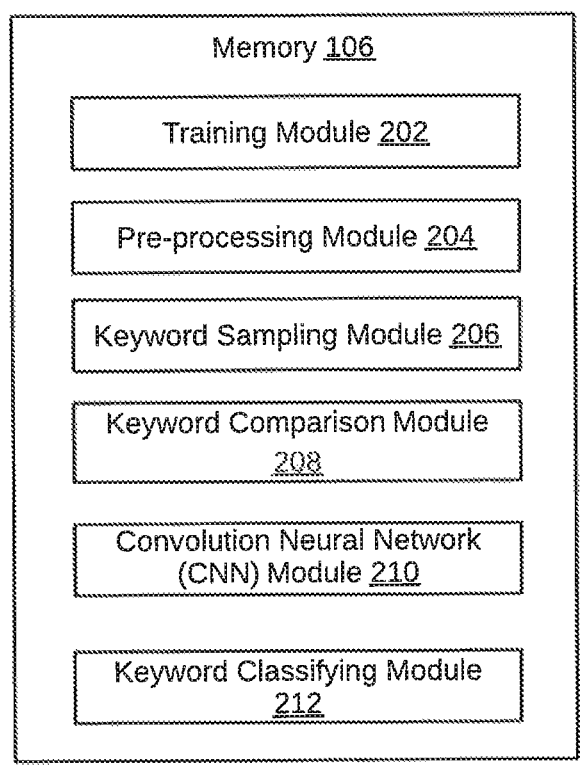
FIG. 2 illustrates a block diagram of a memory of a system for identifying relevant keywords from a document, in accordance with an embodiment.

Referring now to FIG. 2, a functional block diagram of the memory 106. implemented by the keyword extracting device 102, is illustrated in accordance with an embodiment. The memory 106 may include various modules that may perform various functions so as to identify relevant keywords from a document. The memory 106 may include a training module 202, a pre-processing module 204, a keyword sampling module 206, a keyword comparison module 208, a Convolution Neural Network (CNN) Module 210, and a keyword classifying module 212. As will be appreciated by those skilled in the art, all such aforementioned modules 202-212 may be represented as a single module or a combination of different modules. Moreover, as will be appreciated by those skilled in the art, each of the modules 202-212 may reside, in whole or in parts, on one device or multiple devices in communication with each other.

The training module 202 may receive the training document set that may be used to train the keyword extraction device 102 to identify relevant keywords from documents. Once the keyword extraction device 102 is trained, the training module 202 may use the testing document set to testing whether the keyword extraction device 102 is able to identifying relevant keywords from the documents or not. Once the keyword extraction device 102 is trained and tested by the training module 202, the keyword extraction device 102 may then be implemented to identify relevant keywords from the documents.

Once a document has been provided to the keyword extraction device 102 for extraction of relevant keywords, the pre-processing module 204 may first perform pre-processing of the document. Pre-processing the document may include removing unwanted characters, converting upper case letters to lower case letters, tokenizing words, and removing stop words. Thereafter, the keyword sampling module 206 may split the text of the document into a plurality of keyword samples. It may be noted that each of the plurality of keyword samples generated by the keyword sampling module 206 may include a predefined number of keywords extracted in a sequence. In other words, each of the plurality of keyword samples may include equal number of keywords. Additionally, each pair of adjacent keyword samples in the plurality of samples may include a plurality of common words. By way of an example, for two adjacent keyword samples, each of which includes four keywords, three keywords may be common between the adjacent keyword samples.

The keyword comparison module 208 may then compare one or more keywords in each of the plurality of keyword samples with each relevant keyword in the keyword repository 110. Alternatively, the keyword comparison module 208 may compare the one or more keywords in each of the plurality of keyword samples with each relevant keyword and each non-relevant keyword in the keyword repository 110. It may be understood that separate keyword repositories may exist for relevant keywords and non-relevant keywords, or a single repository may include both the relevant keywords and the non-relevant keywords. Based on the comparison, the keyword comparison module 208 may assign a relevancy score to keywords in each of the plurality of keyword samples. The keywords may then be classified as relevant or non-relevant based on the relevancy score so assigned. This is further explained in detail in conjunction with FIG. 3.

The CNN module 210 may check if keywords that have been found to be non-relevant upon comparison with the keyword repository 110 are relevant or not using a trained CNN model. In one embodiment, the CNN module 210 may create a vector embedding for each of the plurality of keyword samples to obtain a matrix representation of each of the plurality of samples. By using matrix representation as an input to the trained CNN model, a relevancy score for each of the plurality of keyword samples may be determined. This is further explained in detail in conjunction with FIG. 3 to FIG. 6.

Once relevancy scores are assigned to keywords in each of the plurality of keywords samples (either by the keyword comparison module 208 or the CNN module 210), the keyword classifying module 212 may classify the keywords from each of the plurality of keyword samples as relevant keywords or non-relevant keywords based on the relevancy score.

It should be noted that the keyword extracting device 102 may be implemented in programmable hardware devices such as programmable gate arrays, programmable array logic, programmable logic devices, or the like. Alternatively, the keyword extracting device 102 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

As will be appreciated by those skilled in the art, a variety of processes may be employed for identifying relevant keywords from a document. For example, the exemplary system 100 and the keyword extracting device 102 may identify relevant keywords by the processes discussed herein. In particular, as will be appreciated by those of ordinary skill in the art, control logic and/or automated routines for performing the techniques and steps described herein may be implemented by the system 100 and the keyword extracting device 102, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
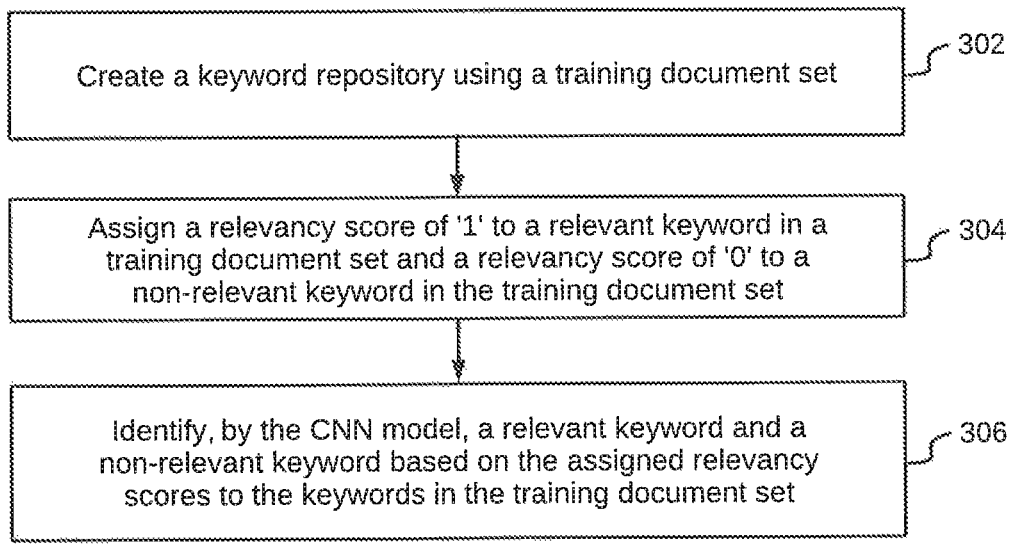
FIG. 3 illustrates a flowchart of a method for training a Convolutional neural network (CNN) model using a training document set, in accordance with an embodiment.

Referring now to FIG. 3, a flowchart of a method for training a CNN model using a training document set is illustrated, in accordance with an embodiment. At step 302, a keyword repository (for example, the keyword repository 110) is created using a training document set. The training document set may be selected, such that, an exhaustive list of keywords is included in the keyword repository. The keyword repository may be created by extracting keywords from the training document set.

At step 304, a relevancy score may be assigned to each of the keywords in the keyword repository. The relevancy scores may be assigned manually. In one embodiment, a relevancy score of '1' may be assigned to a relevant keyword extracted from the training document set and stored in the keyword repository. Similarly, a relevancy score of '0' may be assigned to a non-relevant keyword extracted from the training document set and stored in the keyword repository. In an embodiment, after the relevancy scores are assigned, the keyword repository may be refined to only include relevant keywords. It will be apparent to a person skilled in the art that any other relevancy scores may be assigned to the relevant keyword and the non-relevant keyword. Alternatively, relevancy tags may be assigned to relevant and non-relevant keywords in the keyword repository.

At step 306, the CNN model may be trained to identify a relevant keyword and a non-relevant keyword based on the assigned relevancy scores to keywords in the keyword repository. In other words, the CNN model may be trained to identify a keyword that has been assigned a relevancy score of '1' as a relevant keyword, and a keyword that has been assigned a relevancy score '0' as a non-relevant keyword. Accordingly, once the CNN model is trained to identify relevant keywords and non-relevant keywords, the CNN model may be implemented to identify relevant keywords from documents.

Figure 4A:
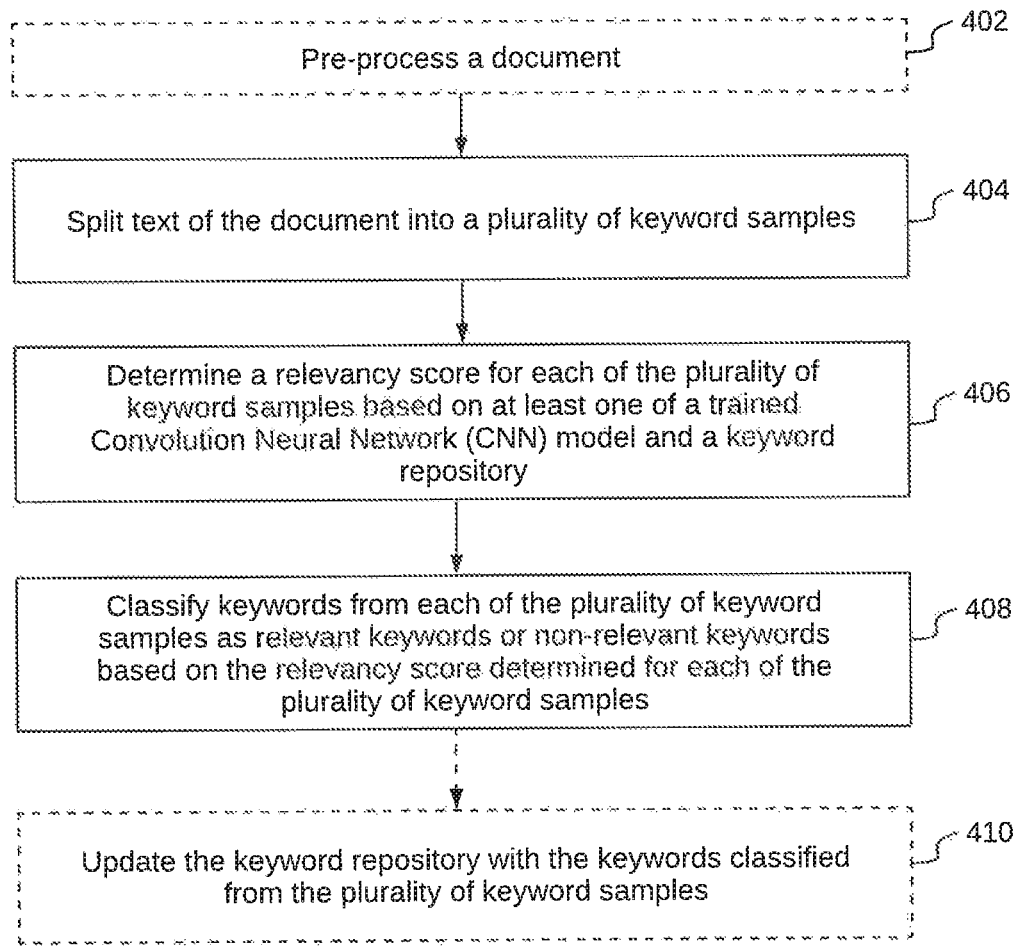
FIG. 4A illustrates a flowchart of a method for identifying relevant keywords from a document, in accordance with an embodiment.

Referring now to FIG. 4A, a flowchart of a method for identifying relevant keywords from a document is illustrated, in accordance with an embodiment. After a document is received, a keyword extracting device 102, at step 402, may perform pre-processing of the document. The pre-processing may include one or more of removing unwanted characters, converting upper case letters to lower case letters, tokenizing words, and removing stop words. In other words, through pre-processing, the document may be made ready for the identifying of keywords in the subsequent steps. This reduces the time and computational resources required to identify relevant keywords.

At step 404, the keyword extracting device 102 may split text of the document into a plurality of keyword samples. It may be noted that each of the plurality of keyword samples may include a predefined number of keywords extracted in a sequence. In other words, the number of keywords in each of the plurality of keyword samples is the same. Moreover, each pair of adjacent keyword samples in the plurality of samples may include a plurality of common words. In an embodiment, when each keyword sample includes 'n' keywords, each of the adjacent keyword samples may include 'n–1' common keywords and one uncommon keyword. By way of an example, the document may include the following text: "I am a software engineer" and the predefined number is three keywords. In this case, the keyword extracting device 102 will split the text into three keyword samples such that each keyword sample includes three keywords extracted in a sequence, i.e., "I am a," "am a software," and "a software engineer." In each adjacent keyword samples two keywords are common.

In one embodiment, the plurality of keyword samples may be created by using shifting window techniques. According to the shifting window technique, each of the plurality of keyword samples may include a predefined number of keywords extracted in a sequence, such that each pair of adjacent keyword samples in the plurality of samples may include a plurality of common words. An example keyword sample (Xk) may be represented by equation 1 given below:

$$Xk=[Tk, T(k+1), T(k+2), T(k+w-1)] \quad (1)$$

In the above equation, 'w' may relate to a keyword sample size (that is, the predefined number of keyword in one keyword sample). Further, various different keyword samples may be obtained by varying the value of 'k'. By way of an example, the text of a document that includes 15 keywords may be split to obtain 15 keyword samples. Further, each keyword sample may include 10 keywords (i.e. 'w'=10). Accordingly, a first, a second, and a third keyword sample may be represented by equation 2, equation 3, and equation 4, respectively, given below:

$$X1=[T1, T2, \ldots T10](\text{for, } k=1) \quad (2)$$

$$X2=[T2, T3, \ldots T11](\text{for, } k=2) \quad (3)$$

$$X3=[T3, T4, \ldots T12](\text{for, } k=3) \quad (4)$$

As represented in the above equations, a first keyword sample from the plurality of keyword samples may be formed using first 10 keywords, i.e., keywords 1 to 10, of the text in the document, the second keyword sample may be formed using keywords 2 to 11 of the text in the document, and the third keyword sample may be formed using keywords 3 to 12 of the text in the document.

At step 406, the keyword extraction device 102 may determine a relevancy score for each of the plurality of keyword samples using a relevancy score. Each adjacent keyword samples in the plurality of keyword samples may include a keyword for which the relevancy score may be determined. The keywords for which the relevancy score may be determined may co-exist adjacent to each other in the text of the document. By way of an example, the keyword samples created for the text "I am a software engineer," include the following keyword samples: "I am a," "am a software," and "a software engineer." The relevancy score may be determined for the last keyword in each keyword sample, such that, the last keyword for each keyword sample are adjacent keywords in the text.

In one embodiment, in order to determine relevancy score for a keyword sample, it may be checked whether at least one keyword from the keyword sample is a relevant keyword or not. By way of an example, the last word in each of the plurality of keyword samples may be checked for relevancy. It will be apparent to a person skilled in the art that any sequence of keyword in each of the plurality of keyword samples may be used for relevancy determination. The relevancy score may be determined based on one or more of a keyword repository and a trained CNN model. It will be apparent to those skilled in the art that any machine language or neural network other than CNN may be used to determine the relevancy scores.

In one embodiment, a keyword in each of the plurality of keyword samples may be compared with each relevant keyword in the keyword repository. In an alternate embodiment, a keyword in each of the plurality of keyword samples may be compared with each relevant keyword and each non-relevant keyword in the keyword repository. It may be understood that separate keyword repositories may exist for relevant keywords and non-relevant keywords, or a single repository may include both the relevant keywords and the non-relevant keywords. By way of an example, the text of the document may be split into keyword samples with 10 keywords in each keyword sample, and the 10th word in each keyword sample may be checked for relevancy by comparing with the keyword repositories. Based on the comparison, a relevancy score of '1' may be automatically assigned to each 10th keyword of each keyword sample that matches a relevant keyword in the keyword repository. Similarly, based on the comparison, a relevancy score of '0' may be automatically assigned to each 10th keyword of each keyword sample that does not match a relevant keyword in the keyword repository.

The keywords that are found to be non-relevant upon comparison with relevant keywords and the non-relevant keywords in the keyword repositories may be further checked for relevancy using the trained CNN model. As per the CNN model, in one embodiment, a vector embedding may be created for each of the plurality of keyword samples. Further, a matrix representation of vector embedding created for each of the plurality of samples may be obtained. An exemplary matrix representation 412 of each of a plurality of samples is depicted in FIG. 4B.

The matrix representation of each of the plurality of samples may then be used as an input to the CNN model.

Based on the trained CNN model, a relevancy score for each of the plurality of keyword samples may be determined. The relevancy score determined for each of the plurality of keyword samples by the CNN model may be based on relevancy score determined by the CNN model for vector embedding for each of the plurality of keyword samples. Accordingly, a relevancy score of '1' or a relevancy score of '0' may be assigned to the keywords.

Based on the relevancy score determined for each of the plurality of keyword samples, at step 408, the keyword extraction device 102 may classify the keywords in each of the plurality of keyword samples (such as the last keyword in a keyword sample) as relevant keywords or non-relevant keywords. By way of an example, keywords that were assigned the relevancy score of '1' may be classified as relevant keywords, and the keywords that were assigned the relevancy score of '0' may be classified as non-relevant keywords.

At step 410, the keyword extraction device 102 may update the keyword repository with the keywords classified from the plurality of keyword samples. By way of an example, a single keyword repository may be updated with the relevant keywords. By way of another example, a keyword repository of relevant keywords and a keyword repository of non-relevant keywords may be updated with relevant and non-relevant keywords, respectively. The updated repository may later be used to determine relevancy score for keywords of each of a plurality of keyword samples in a next cycle of identifying relevant keywords from a document.

Figure 5:
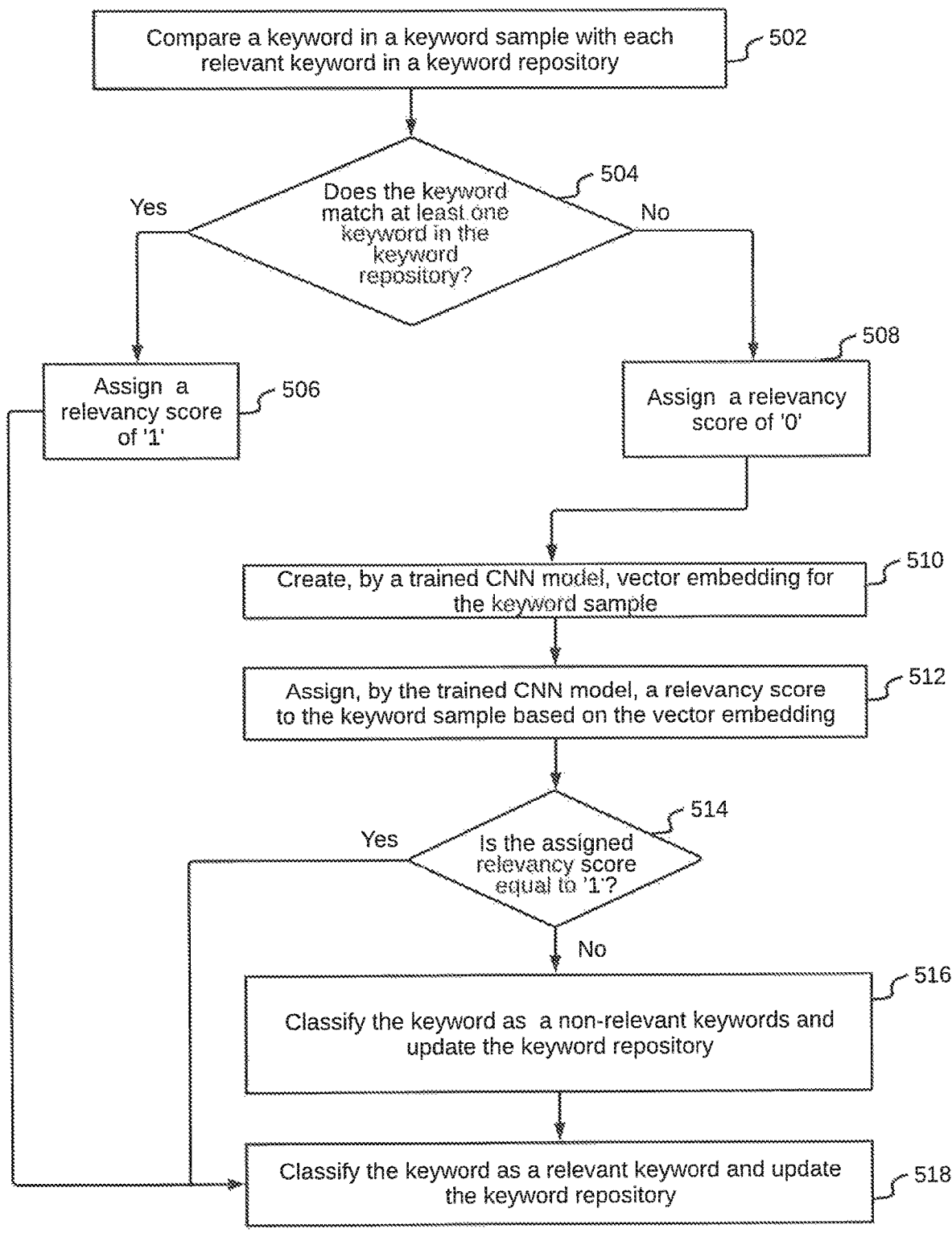
FIG. 5 illustrates a flowchart of a method for identifying relevant keywords from a document, in accordance with another embodiment.

Referring now to FIG. 5, a flowchart of a method for identifying relevant keywords from a document, in accordance with another embodiment. At step 502, a keyword in a keyword sample may be compared with each relevant keyword in a keyword repository. Alternately or additionally, the keyword in the keyword sample may be compared with each non-relevant keyword in the keyword repository.

At step 504, a check is performed to determine whether the keyword matches with one or more relevant keywords in the keyword repository. If the keyword matches with one or more relevant keywords, the keyword is assigned a relevancy score of '1' at step 506. Thereafter, at step 518, the keyword is classified as a relevant keyword and the keyword repository is updated. However, if the keyword does not match with one or more relevant keywords, the keyword is assigned a relevancy score of '0' at step 508. A relevancy score of '1' may be automatically assigned to the keyword, when the keyword matches with one or more relevant keywords and a relevancy score of '0' may be automatically assigned to the keyword, when the keyword does not match with one or more relevant keywords. In an embodiment, a relevancy score of '0' may be automatically assigned to the keyword, when the keyword matches with one or more non-relevant keywords in the keyword repository.

Thereafter, at step 510, a vector embedding may be created for the keyword sample by the trained CNN model. The vector embedding represents the usage context of the keyword within the keyword sample. A matrix representation for keyword sample may be obtained, which may then be used as an input to the trained CNN model. At step 512, the trained CNN model may assign a relevancy score to the keyword in the keyword sample based on the vector embedding.

At step 514, a check is performed to determine whether the assigned relevancy score at step 512 is '1' or not. When the assigned relevancy score is '1', the method may proceed to step 518. However, when the assigned relevancy score is not '1' or in other words, when the assigned relevancy score is '0,' the keyword may be classified as non-relevant keywords and the keyword repository may be updated with the keyword, at step 516.

Figure 6A:
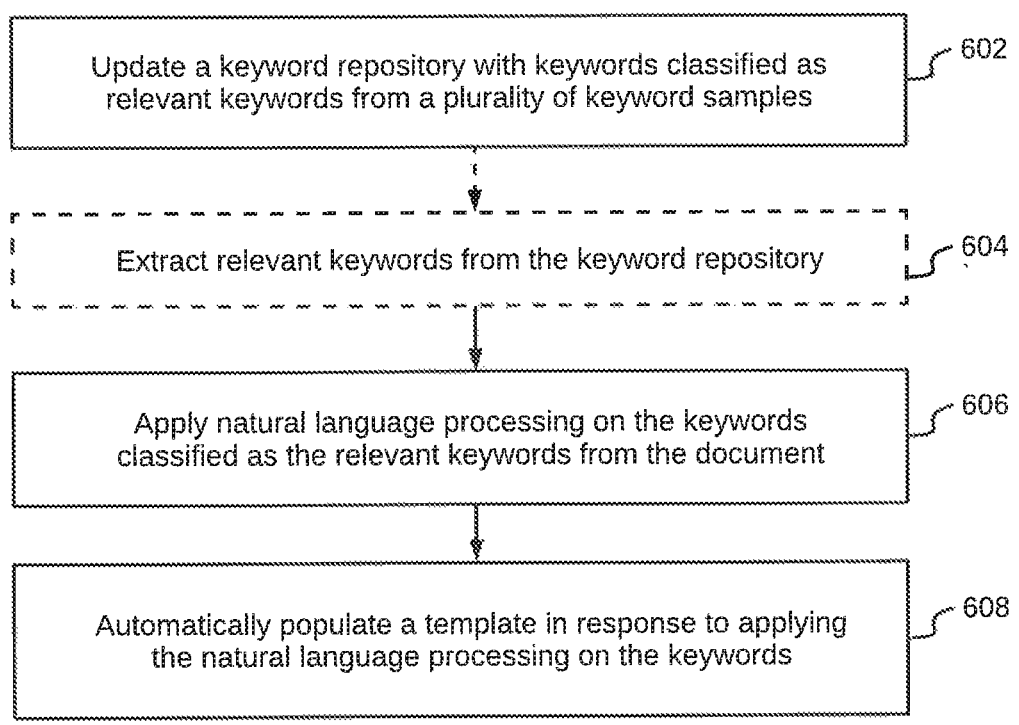
FIG. 6A illustrates a flowchart of a method for automatically populating a template in response to applying natural language processing on keywords, in accordance with an embodiment.

Referring now to FIG. 6, a flowchart of a method for automatically populating a template is illustrated, in accordance with an embodiment. By way of an example, the method may be implemented for populating a job description template using the identified relevant keywords.

At step 602, a keyword repository may be updated with keywords classified as relevant keywords from a plurality of keyword samples of a document. In one embodiment, the documents may be retrieved from a resume database of an organization. It may be understood that the resume database may be classified in terms of various categories, such as job role, technology area, and experience.

At step 604, relevant keywords may be extracted from the keyword repository. In case the document is retrieved from a resume database, the relevancy of the keywords may be based on the role or technology specialization for which the job description is to be prepared. In one embodiment, the relevant keywords may be extracted from the keyword repository based on user input. In case the document is retrieved from a resume database, the user input may define a job role for which the job description is to be prepared. It may be understood that the user input may be received through a user interface which may include a keyboard, a mouse, or a touch screen. In a further embodiment, the user may be presented with a list of various options of job roles and job technology domains via the user interface, and the user may select the options for which he wants to create the job description.

At step 606, Natural Language Processing (NLP) may be applied on the keywords classified as the relevant keywords from the document. By way of the NLP, the relevant keywords may be used to create meaningful sentences. At step 608, a template may be automatically populated in response to applying the NLP on the relevant keywords. For example, the sentences created at the previous step may be incorporated in a job description template to create the job description. Once the job description is created, the job description may be presented to a user via a user interface, such as display screen. Alternately, the job description may be reproduced for the user in one of a PDF, a docx, and a text format.

An exemplary model for populating a template for a job description is illustrated through a table 610 depicted in FIG. 6B.

As illustrated in the table 610, an input text in form of a document may be fed to the system 100. By way of an example, the input text may include "I am a software developer. I have expertise in java and html". Thereafter, pre-processing may be performed on the input text so as to remove unwanted characters, convert upper case letters to lower case letters, tokenize words, and remove stop words. As a result, keywords like "software", "develop", "expertise", "java", and "html" may be extracted after eliminating unwanted characters. Upon extracting the keywords, each of the extracted keywords may be manually assigned (labeled) a relevancy score. In the given example, the keywords "software", "develop" and "expertise" are manually assigned a relevancy score "0", and the keywords "java" and "html" are assigned a relevancy score "1".

The manually assigned relevancy score may then be checked for accuracy using vector embedding. For example, the job description may be manually reviewed by a concerned person, such as a hiring manager. Based on the review, the concerned person may approve or reject the job description based on the accuracy of job description.

Therefore, it may be important to check the manually assigned relevancy score for accuracy. Accordingly, a plurality of keyword samples may be prepared. Thereafter, vector embedding may be created for each of the plurality of keyword samples. Each of the plurality of samples may then be passed through the trained CNN model, which may assign a relevancy score to at least one keyword in each of the keyword samples based on the vector embedding. As explained earlier, the vector embedding may represent the usage context of the at least one keyword in the keyword sample. In the given example, the usage context may be defined based on the required skill set for which the job description is to be created. Further, the relevancy score assigned to a keyword sample may be based on the relevancy of the at least one keyword in each of the plurality of keyword samples. Further, a relevancy score "1" may be assigned to a keyword sample having a keyword found relevant with respect to the skill set of the job description. Similarly, a relevancy score of "0" may be assigned to a keyword sample having a keyword found non-relevant. In the given example, the keyword sample $(x_1, y_1)$ is assigned a relevancy score of "0", and the keyword samples $(x_z, y_z)$ and $(x_a, y_a)$ are assigned relevancy score "1".

Another exemplary model for populating a template for a job description is illustrated through a table 612 depicted in FIG. 6B. The table 612 shows a sample testing model output of the keyword generator. In the example, an input text is provided which states "I have worked at oracle for 5 years. I have hands on experience in oracle, MySQL, spring" and the testing model output extracts the relevant keywords and classifies the sentences into relevant keywords and non-relevant keywords as shown in the table 612.

As illustrated in the table 612, an input text "I have worked at oracle for 5 years. I have hands on experience in oracle, MySQL, spring" is fed to a system 100. The system 100 may identify the relevant keywords in the input text which may later be sued for populating a template for a job description. In the given example the system 100 may give a model output of the relevant keywords which includes "Oracle", "MySQL" and "springs". The model output may further include non-relevant keywords "worked", "years", "experience" and "hands".

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
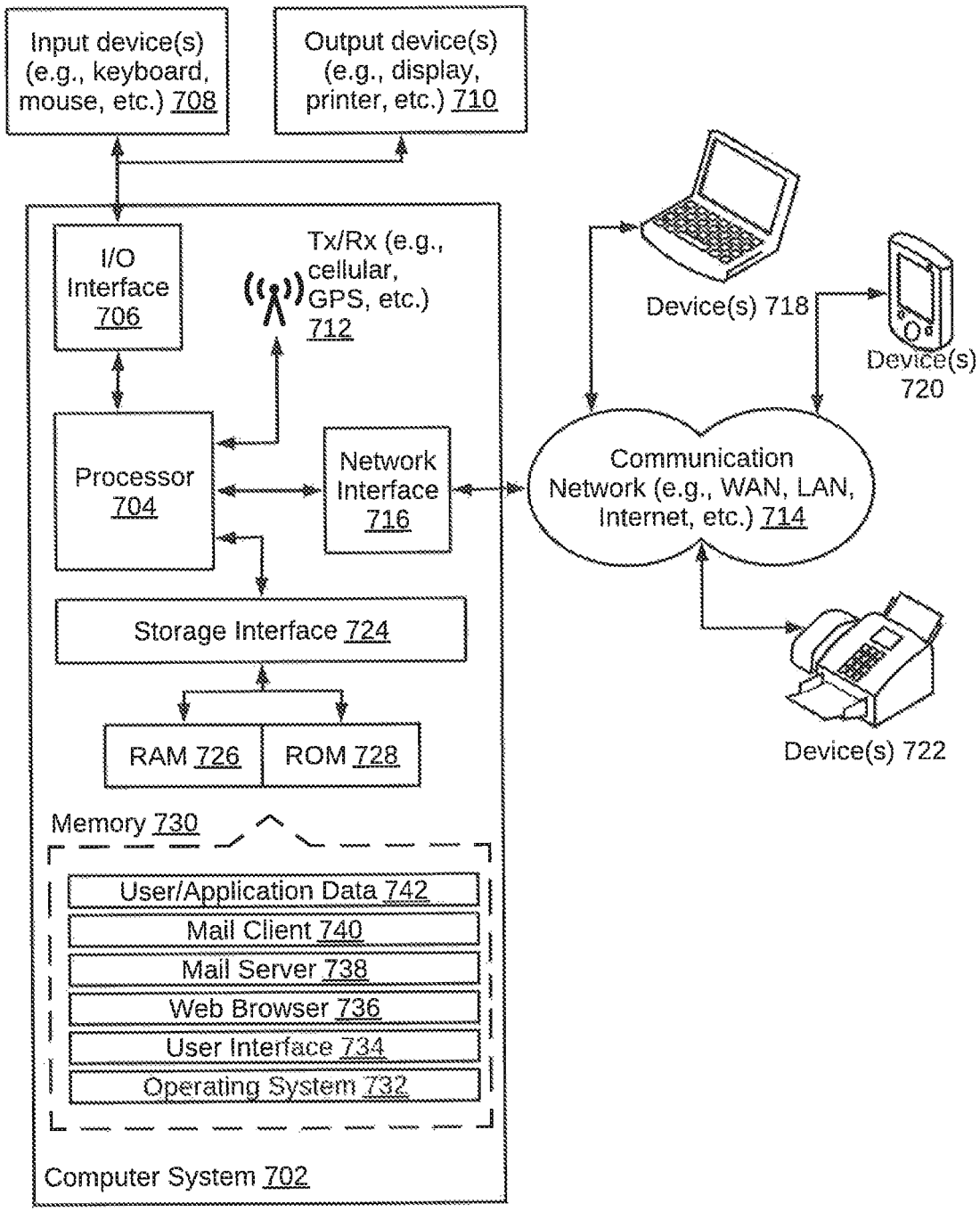
FIG. 7 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, a block diagram of an exemplary computer system 702 for implementing various embodiments is illustrated. Computer system 702 may include a central processing unit ("CPU" or "processor") 704. Processor 704 may include at least one data processor for executing program components for executing user- or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DUI), high-definition multimedia interface (HDMI), RF antennas, S-Video, VGA, IEEE 802.n /b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dangle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM® BCM45501UB8® transceiver, INFINEON TECHNOLOGIES® X-GOLD 618-PMB9800® transceiver, or the like), providing IEEE 802.6a/b/g/n, Bluetooth. FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices may include, without limitation, personal compute (s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc, Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 702 may implement a mail server 738 stored program component. Mail server 738 may be an Internet mail server such as MICROSOFT® EXCHANGE® mail server, or the like, Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in the various embodiments discussed above pertain to identifying relevant keywords from documents, such as unstructured documents using supervised or semi-supervised machine learning techniques. The techniques provide for improved analyzing of documents thereby allowing identifying of relevant keywords from unstructured documents. Further, iterative updating of the keyword repository with new relevant keywords provides for more accurate identification of relevant keywords. Furthermore, various techniques for populating templates (such as those for creating job descriptions) using identified relevant keywords are provided. Hence, techniques may help reduce manual effort and time for creating the template. For example, the techniques may help cut time and effort of a hiring manager in creating new job descriptions by automating the process of creating job descriptions. The techniques further make the process of creating job descriptions more efficient by providing for latest skill sets required for the job role.

The specification has described method and system for identifying relevant keywords from a document. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of identifying relevant keywords from a document, the method comprising:

splitting, by a keyword extracting device, text of the document into a plurality of keyword samples, wherein each of the plurality of keyword samples comprises a predefined number of keywords extracted in a sequence, and wherein each pair of adjacent keyword samples in the plurality of keyword samples comprises a plurality of common keywords, wherein for each keyword sample having 'n' keywords, each of the adjacent keyword samples comprises 'n−1' common keywords and one uncommon keyword, and wherein each of the plurality of keyword samples includes equal number of keywords;

determining, by the keyword extracting device, a relevancy score for each of the plurality of keyword samples based on at least one of a trained Convolution Neural Network (CNN) model and a keyword repository, wherein the relevancy score for each of the plurality of keyword samples is determined using a relevancy score for at least one keyword in each of the plurality of keyword samples, wherein the keywords for which the relevancy score is determined in adjacent keyword samples, co-exist adjacent to each other in the text of the document, and wherein determining the relevancy score for each of the plurality of keyword samples comprises:

creating a vector embedding for at least one keyword in the plurality of keyword samples, wherein the vector embedding represents usage context of the at least one keyword in the plurality of keyword samples; and assigning, by the trained CNN model, a relevancy score to the at least one keyword in the plurality of keyword samples based on the vector embedding;

classifying, by the keyword extracting device, keywords from each of the plurality of keyword samples as relevant keywords or non-relevant keywords based on the relevancy score determined for each of the plurality of keyword samples; and updating the keyword repository with the keywords classified from the plurality of keyword samples.

2. The method of claim 1 further comprising creating the keyword repository using a training document set, wherein the keyword repository comprises at least one relevant keyword and at least one non-relevant keyword obtained from the training document set.

3. The method of claim 2 further comprising training the CNN model using the training document set, wherein the training comprises:

assigning a relevancy score of 1 to a relevant keyword in the training document set and a relevancy score of 0 to a non-relevant keyword in the training document set; and identifying, by the CNN model, a relevant keyword and a non-relevant keyword based on the assigned relevancy scores to the keywords in the training document set.

4. The method of claim 1 further comprising pre-processing the document, wherein the pre-processing comprises at least one of removing unwanted characters, converting upper case letters to lower case letters, tokenizing words, or removing stop words.

5. The method of claim 1, wherein determining a relevancy score for each of the plurality of keyword samples based on the keyword repository comprises:

comparing at least one keyword in each of the plurality of keyword samples with each relevant keyword in the keyword repository; and automatically assigning a relevancy score of '1' to one or more of the at least one keyword matching relevant keywords in the keyword repository and a relevancy score of '0' to one or more of the at least one keyword not matching relevant keywords in the keyword repository.

6. The method of claim 1, wherein the trained CNN model:
- assigns a relevancy score of 1 to the at least one keyword, when the usage context of the vector embedding is associated with a relevant keyword; and
- assigns a relevancy score of 0 to the at least one keyword, when the usage context of the vector embedding is associated with a non-relevant keyword.

7. The method of claim 1 further comprising:
- applying natural language processing on the keywords classified as relevant keywords from the document; and
- automatically populating a template in response to applying the natural language processing on the keywords.

8. The method as claimed in claim 1 wherein determining the relevancy score for each of the plurality of keyword samples is based on a checking whether the at least one keyword from the plurality of keyword samples is a relevant keyword or a non-relevant keyword.

9. A keyword extracting device for identifying relevant keywords from a document, the keyword extracting device comprising:
- a processor; and
- a memory communicatively coupled to the processor, wherein the memory stores processor instructions, which, on execution, causes the processor to:
  - split text of the document into a plurality of keyword samples, wherein each of the plurality of keyword samples comprises a predefined number of keywords extracted in a sequence, and wherein each pair of adjacent keyword samples in the plurality of keyword samples comprises a plurality of common words, wherein for each keyword sample having 'n' keywords, each of the adjacent keyword samples comprises 'n–1' common keywords and one uncommon keyword, and wherein each of the plurality of keyword samples includes equal number of keywords;
  - determine a relevancy score for each of the plurality of keyword samples based on at least one of a trained Convolution Neural Network (CNN) model and a keyword repository, wherein the relevancy score for each of the plurality of keyword samples is determined using a relevancy score for at least one keyword in each of the plurality of keyword samples, wherein the keywords for which the relevancy score is determined in adjacent keyword samples, co-exist adjacent to each other in the text of the document, and wherein determining the relevancy score for each of the plurality of keyword samples comprises:
    - creating a vector embedding for at least one keyword in the plurality of keyword samples, wherein the vector embedding represents usage context of the at least one keyword in the plurality of keyword samples; and
    - assigning, by the trained CNN model, a relevancy score to the at least one keyword in the plurality of keyword samples based on the vector embedding;
  - classify keywords from each of the plurality of keyword samples as relevant keywords or non-relevant keywords based on the relevancy score determined for each of the plurality of keyword samples; and
  - update the keyword repository with the keywords classified from the plurality of keyword samples.

10. The keyword extracting device of claim 9, wherein the processor instructions further cause the processor to create the keyword repository using a training document set, wherein the keyword repository comprises at least one relevant keyword and at least one non-relevant keyword obtained from the training document set.

11. The keyword extracting device of claim 10, wherein the processor instructions further cause the processor to
- assign a relevancy score of 1 to a relevant keyword in the training document set and a relevancy score of 0 to a non-relevant keyword in the training document set; and
- identify, by the CNN model, a relevant keyword and a non-relevant keyword based on the assigned relevancy scores to the keywords in the training document set.

12. The keyword extracting device of claim 9, wherein determining a relevancy score for each of the plurality of keyword samples based on the keyword repository comprises:
- comparing at least one keyword in each of the plurality of keyword samples with each relevant keyword in the keyword repository; and
- automatically assigning a relevancy score of '1' to one or more of the at least one keyword matching relevant keywords in the keyword repository and a relevancy score of '0' to one or more of the at least one keyword not matching relevant keywords in the keyword repository.

13. The keyword extracting device of claim 9, wherein the trained CNN model is to:
- assigns a relevancy score of 1 to the at least one keyword, when the usage context of the vector embedding is associated with a relevant keyword; and
- assigns a relevancy score of 0 to the at least one keyword, when the usage context of the vector embedding is associated with a non-relevant keyword.

14. The keyword extracting device of claim 9, wherein the processor instructions further cause the processor to
- apply natural language processing on the keywords classified as relevant keywords from the document; and
- automatically populate a template in response to applying the natural language processing on the keywords.

15. A non-transitory computer-readable storage medium having stored thereon, a set of computer-executable instructions causing a computer comprising one or more processors to perform steps comprising:
- splitting text of the document into a plurality of keyword samples, wherein each of the plurality of keyword samples comprises a predefined number of keywords extracted in a sequence, and wherein each pair of adjacent keyword samples in the plurality of keyword samples comprises a plurality of common words, wherein for each keyword sample having 'n' keywords, each of the adjacent keyword samples comprises 'n–1' common keywords and one uncommon keyword, and wherein each of the plurality of keyword samples includes equal number of keywords;
- determining a relevancy score for each of the plurality of keyword samples based on at least one of a trained Convolution Neural Network (CNN) model and a keyword repository, wherein the relevancy score for each of the plurality of keyword samples is determined using a relevancy score for at least one keyword in each of the plurality of keyword samples, wherein the keywords for which the relevancy score is determined in adjacent keyword samples, co-exist adjacent to each other in the text of the document, and wherein determining the relevancy score for each of the plurality of keyword samples comprises:
  - creating a vector embedding for at least one keyword in the plurality of keyword samples, wherein the vector embedding represents usage context of the at least one keyword in the plurality of keyword samples; and assigning, by the trained CNN model, a relevancy score to the at least one keyword in the plurality of keyword samples based on the vector embedding;

classifying keywords from each of the plurality of keyword samples as relevant keywords or non-relevant keywords based on the relevancy score determined for each of the plurality of keyword samples; and updating the keyword repository with the keywords classified from the plurality of keyword samples.

\* \* \* \* \*